United States Patent
Naya et al.

(10) Patent No.: US 7,834,567 B2
(45) Date of Patent: Nov. 16, 2010

(54) MOTOR DRIVE DEVICE

(75) Inventors: Tomohiko Naya, Osaka (JP); Tomohiro Inoue, Tottori (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 12/063,057

(22) PCT Filed: Oct. 27, 2006

(86) PCT No.: PCT/JP2006/321467

§ 371 (c)(1),
(2), (4) Date: Feb. 6, 2008

(87) PCT Pub. No.: WO2007/052542

PCT Pub. Date: May 10, 2007

(65) Prior Publication Data

US 2009/0256504 A1    Oct. 15, 2009

(30) Foreign Application Priority Data

Nov. 1, 2005   (JP) .............................. 2005-317924

(51) Int. Cl.
 *H02P 6/06* (2006.01)
(52) U.S. Cl. ..................... 318/400.03; 318/34; 318/364
(58) Field of Classification Search ............ 318/400.03, 318/34, 364, 280, 268, 270, 271, 281, 283, 318/362, 372, 376, 139
See application file for complete search history.

(56) References Cited

U.S. PATENT DOCUMENTS 7,002,315 B2   2/2006   Aono et al.

2004/0217724 A1 *  11/2004   Nagasawa et al. ........... 318/280

FOREIGN PATENT DOCUMENTS

| CN | 1462914 A | 12/2003 |
|---|---|---|
| JP | 2662397 B2 | 6/1997 |
| JP | 11-113280 | 4/1999 |
| JP | 2001-286175 A | 10/2001 |
| JP | 2003-202719 A | 7/2003 |
| JP | 2005-65486 A | 3/2005 |
| JP | 2005-257258 A | 9/2005 |
| WO | WO 02/086883 A1 | 10/2002 |

OTHER PUBLICATIONS

International Search Report for PCT/JP2006/321467, dated Jan. 30, 2007.

* cited by examiner

*Primary Examiner*—Karen Masih
(74) *Attorney, Agent, or Firm*—RatnerPrestia

(57) ABSTRACT

A motor drive device for alternately driving a plurality of motors includes a position detection signal processing circuit for processing position detection signals of the plurality of motors, a pre-drive circuit for generating an excitation switching signal of the motors, a plurality of power switching circuits for supplying an electric current to the motors in response to an output from the pre-drive circuit, and a motor switching circuit for instructing a switchover of driving the motors. The position detection signal processing circuit, in response to an input signal to the motor switching circuit, selects a position detection signal of a motor to be driven out of the position detection signals of the plurality of motors, and inputs a position detection processed signal to the pre-drive circuit for selecting one of the plurality of power switching circuits.

8 Claims, 12 Drawing Sheets

MOTOR DRIVE DEVICE

This application is a U.S. National Phase Application of PCT International Application PCT/JP2006/321467.

TECHNICAL FIELD

The present invention relates to a motor drive device alternately driving a plurality of motors used in an apparatus.

BACKGROUND ART

In recent years, a number of motors have been often used in an individual audio & video apparatus or an individual office automation apparatus. Some home appliances such as a dishwasher or a washing and drying machine also employs a plurality of motors.

Each one of the motors has been provided with a driving circuit and a control circuit so that the plurality of motors can be driven or controlled. The entire circuit thus becomes complicated, which prevents the apparatuses from being downsized or less expensive. To overcome this problem, it has been proposed that a plurality of driving circuits is integrated into one chip IC. This proposal is disclosed in, e.g. Japanese Patent No. 2662397.

The technique disclosed in this patent publication is this: A constant-current driving element, which incurs a greater loss among others, is disposed outside an IC chip so that an obstruction to integrating a plurality of driving circuits into one chip can be lessened, where the obstruction is an increase in heat generated due to greater loss in the IC chip.

FIG. 7 shows the related art disclosed in the foregoing patent publication. In FIG. 7, driving control IC 401 is formed of one chip containing a plurality of push-pull driving block 402, constant-current driving circuit block 403, and power-supply control block 404.

Push-pull driving block 402 outputs a bipolar output voltage, in response to a signal supplied to its input terminal, to DC motors M1 and M2 disposed outside of IC 401 via the IC's output terminals +OUT and −OUT. Constant-current driving circuit block 403 drives, in a constant-current manner, a load coupled to the output terminal in response to the signal supplied to the input terminal. An output from constant-current driving circuit block 403 drives, in a constant-current manner, solenoid S working as a plunger via driving transistor Tr1 externally coupled to driver IC 401. The foregoing structure allows lessening the loss inside the IC and achieving an integration of multiple driving control blocks into one chip IC.

Unexamined Japanese Patent Publication No. 2003-202719 discloses another technique independent of the forgoing technique disclosed in the patent publication. This one refers to a driving device which independently drives a plurality of DC brush-less motors so that a plurality of photosensitive drums of a tandem multi-color image-forming apparatus can be rotated. This invention proposes a technique of integrating the driving circuits of respective brush-less motors into one unit.

This technique allows sharing a part of functions except a switching section with the shafts of the plurality of motors, each one of which motors independently drives a plurality of photosensitive drums, and allows integrating the part of the functions into one chip for downsizing the motor and reducing the cost thereof. This switching section varies the outputs of the motors by switching over exciting coils.

A circuit operation of a conventional driving device of the motors disclosed in this publication is described hereinafter with reference to FIGS. 8 and 9. FIG. 8 shows a conventional circuit structure of this related art. FIG. 9 shows an internal structure of a conventional driving section.

The driving device shown in FIG. 8 drives and controls the objectives to be driven of the image forming apparatus, and is formed of driver 505, image-forming circuit drive device 500, and other motors 503, 504. Circuit drive device 500 is formed of four rotation drive devices. Each one of the rotation drive devices works as a driving source which supplies torque to each one of photosensitive drums 502A, 502B, 502C and 502D for driving those drums. The respective rotation drive devices are formed of sensor-less DC brushless motors 501A, 501B, 501C and 501D respectively, and speed reduction mechanisms corresponding to those sensor-less DC brushless motors, and encoders also corresponding to those motors.

Driver 505 receives a signal from the encoder for driving DC brushless motors 501A, 501B, 50C and 501D, and also drives other motors 503 and 504. This driver 505 is generally formed of various ICs mounted on a sheet of printed circuit board.

FIG. 9 shows an internal structure of driver 505 shown in FIG. 8. Driver 505 is formed of driving circuit 508, control IC 509, and back-electromotive voltage detecting circuit 510. Circuit 510 detects a back-electromotive voltage induced at each one of the phases of stator wirings of DC brushless motor 501A having a three-phase connection, and outputs the detection signal to driver IC 506. Driving circuit 508 is formed of one driver IC 506 and switching section (switching element) 507 responsive to the four shafts of the motors.

Driving circuit 508 receives a speed control signal from control IC 509, and then supplies a three-phase voltage driving signal to respective DC brushless motors 501A, 501B, 501C and 501D. As discussed above, at least a part of the functions except switching section 507 of driving circuit 508 is integrated into one chip, and this part of the functions is shared with the plurality of shafts of the motors. This function allows driver 505 to be downsized and less expensive.

Those related art discussed above need a driving transistor or a switching section to be connected externally to one chip IC, so that a further simplification, downsizing, or cost reduction of the circuit needs integration of all the elements of the circuit that drives the motor into one chip IC. However, a temperature rise due to the loss in the one chip IC should be attentively dealt with. It has been thus difficult to integrate all the elements into one chip IC.

Meanwhile, a CD auto-changer for instance employs motors as driving sources for mounting/removing a disc, lifting/lowering a disc tray, and rotating a disc; however, those motors do not need to work together. Some of the apparatuses having a plurality of motors work in a similar way to the CD auto-changer, i.e. those motors also do not need to work together. Those some of the apparatuses are disclosed in PCT international publication number WO2002/086883. Here is another instance; a household dishwasher is equipped with a plurality of motors including a washing motor, discharging pump motor, and fan motor, and these motors work alternately. This instance is disclosed in, e.g. Unexamined Japanese Patent Publication No. 2001-286175.

A technique is thus proposed for switching over a motor to be driven in an apparatus that employs a plurality of motors and makes those motors work alternately. The proposed technique makes a plurality of motors to be driven by a driving circuit change over to each other and work alternately in the apparatus equipped with the motors that do not need to work together. The technique thus allows the motor driving circuit and its control circuit to be shared with the plurality of motors, and achieves the downsizing and the cost reduction of the apparatus.

FIG. 10 shows the related art disclosed in the foregoing Unexamined Japanese Patent Publication No. 2001-286175. In FIG. 10, inverter circuit 703 converts a dc power of rectifying circuit 702 connected to ac power supply 701 into an ac power, and an output from inverter circuit 703 is switched over by load switcher 704 for driving a plurality of motors 705A, 705B sequentially. This structure allows unifying inverter circuit 703 with control circuit 706 of motors 705A, 705B into one body, so that the unified body can be shared with motors 705A, 705B.

However, this related art has the following problem. Circuit operation of the motor drive device disclosed in the foregoing Unexamined Japanese Patent Publication No. 2001-286175 is described hereinafter with reference to FIGS. 10-12. FIG. 11 shows a timing chart in switching over the motors being driven by the conventional motor drive device based on the related art. The vertical axis represents waveforms of a work/stop switching signal, a motor switching signal, and a surge voltage at the switching. The horizontal axis represents a time. FIG. 12 shows a timing chart in switching over the motors with the conventional motor drive device, and its vertical axis represents waveforms of work/stop switching signal, a motor switching signal, an rpm of a first motor, and an rpm of a second motor. The horizontal axis represents a time as that of FIG. 11 does.

According to the foregoing Unexamined Japanese Patent Publication No. 2001-286175, the motor drive device allows the motors to share inverter circuit 703 driving a plurality of motors and control circuit 706, and motors 705A, 705B are switched over to each other by load switcher 704. However, a stop of inverter circuit 703 generates back-electromotive force due to inertia rotation of the first motor, so that surge voltage 804 is generated at a power switching element of inverter circuit 703. Load switcher 704 needs to directly switch over the lines on which a large current runs, so that it is difficult to integrate load switcher 704 with other elements into one chip IC. Switcher 704 is thus obliged to externally connect to the IC via a mechanical relay. Use of the mechanical relay in order to switch over inverter circuit 703 invites an arc discharge due to the surge voltage, so that a contact life of the relay becomes shorter and the reliability of the relay lowers. To overcome this problem, a given delay time 905 should be prepared, and then load switcher 704 is operated, which obliges the switching time to be longer.

DISCLOSURE OF INVENTION

A motor drive device of the present invention drives a plurality of motors alternately, and the motor drive device comprises the following elements:
a position detection signal processing circuit for processing position detection signals of the plurality of motors;
a pre-drive circuit for generating an excitation switching signal for the motors;
a plurality of power switching circuits for supplying an electric current to the motors in response to an output from the pre-drive circuit; and
a motor switching circuit for instructing a switchover of driving the motors.

The position detection signal processing circuit selects a position detection signal of a motor to be driven out of the position detection signals responsive to the motors, and inputs a position detection processed signal to the pre-drive circuit so that one of the plurality of power switching circuits can be selected for driving the motor to be driven.

The foregoing structure allows the motor drive device of the present invention to shorten a switchover time substantially in alternately driving the motors, and to generate no surge voltage or no arc discharge in the power switching circuits, so that a highly reliable motor drive device with a longer service life is obtainable.

Figure 1:
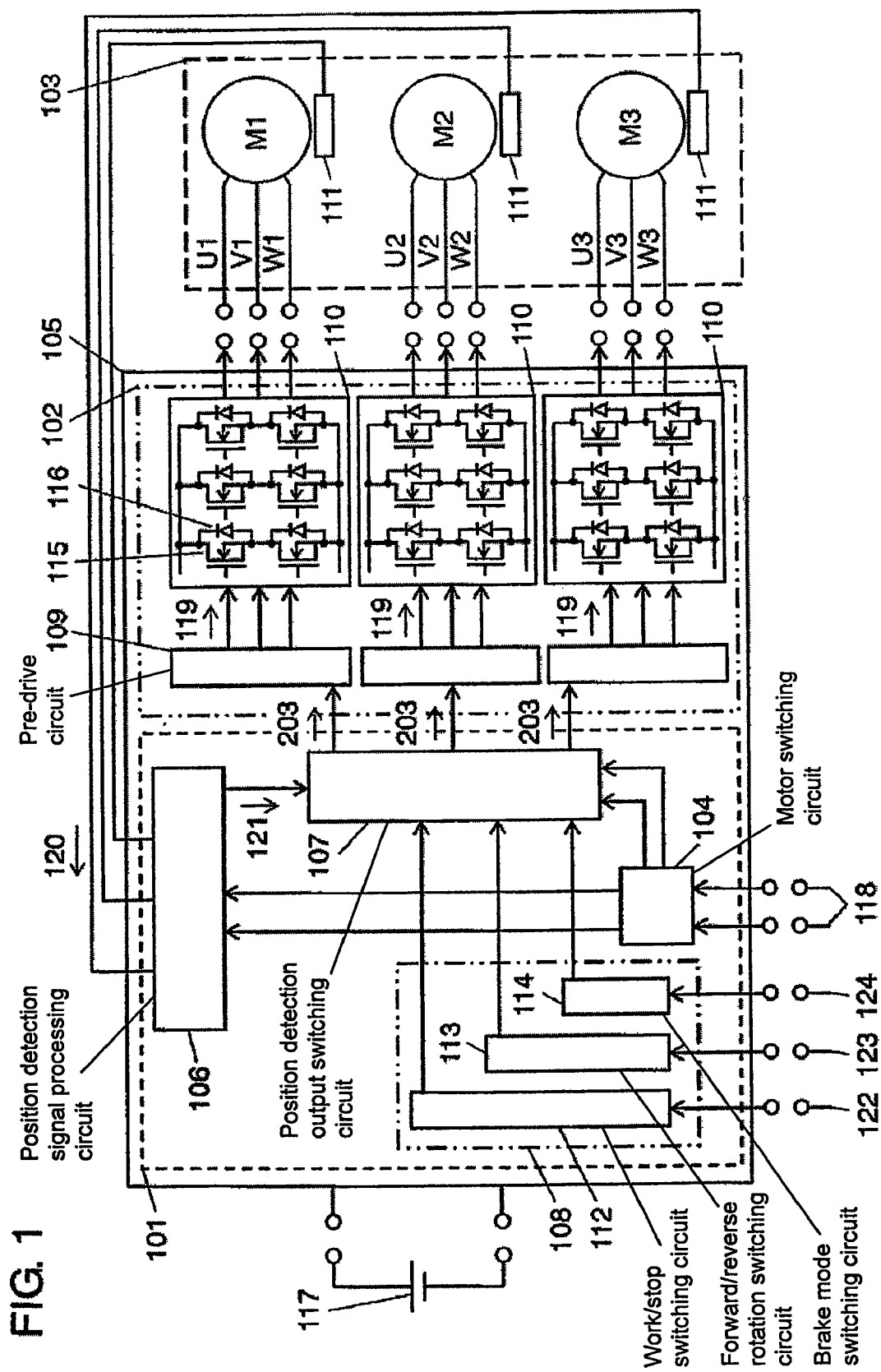
FIG. 1 shows a circuit structure of a motor drive device in accordance with a first embodiment of the present invention.

DESCRIPTION OF REFERENCE MARKS 101 drive control circuit
102 power output circuit
103 motor
104 motor switching circuit
105 one chip semiconductor element
106 position detection signal processing circuit
107 position detection output switching circuit
108 operation mode switching circuit
109 pre-drive circuit
110 power switching circuit
111 position detector
112 work/stop switching circuit
113 forward/reverse rotation switching circuit
114 brake mode switching circuit
115 power switching element
116 anti-parallel diode
117 power supply
118 motor switching signal
119 excitation switching signal
119a first motor excitation switching signal;
119b second motor excitation switching signal;
120 position detection signal 121 position detection processed signal
122 work/stop switching signal
123 forward/reverse rotation switching signal
124 brake mode selecting signal
130 pre-drive output switching signal
203 output signal from position detection output switching circuit
204 output from a power switching circuit of a first motor
205 output from a power switching circuit of a second motor
206 rpm of first motor
207 rpm of second motor

PREFERRED EMBODIMENTS OF THE INVENTION

Exemplary embodiments of the present invention are demonstrated hereinafter with reference to the accompanying drawings.

Embodiment 1

Figure 2:
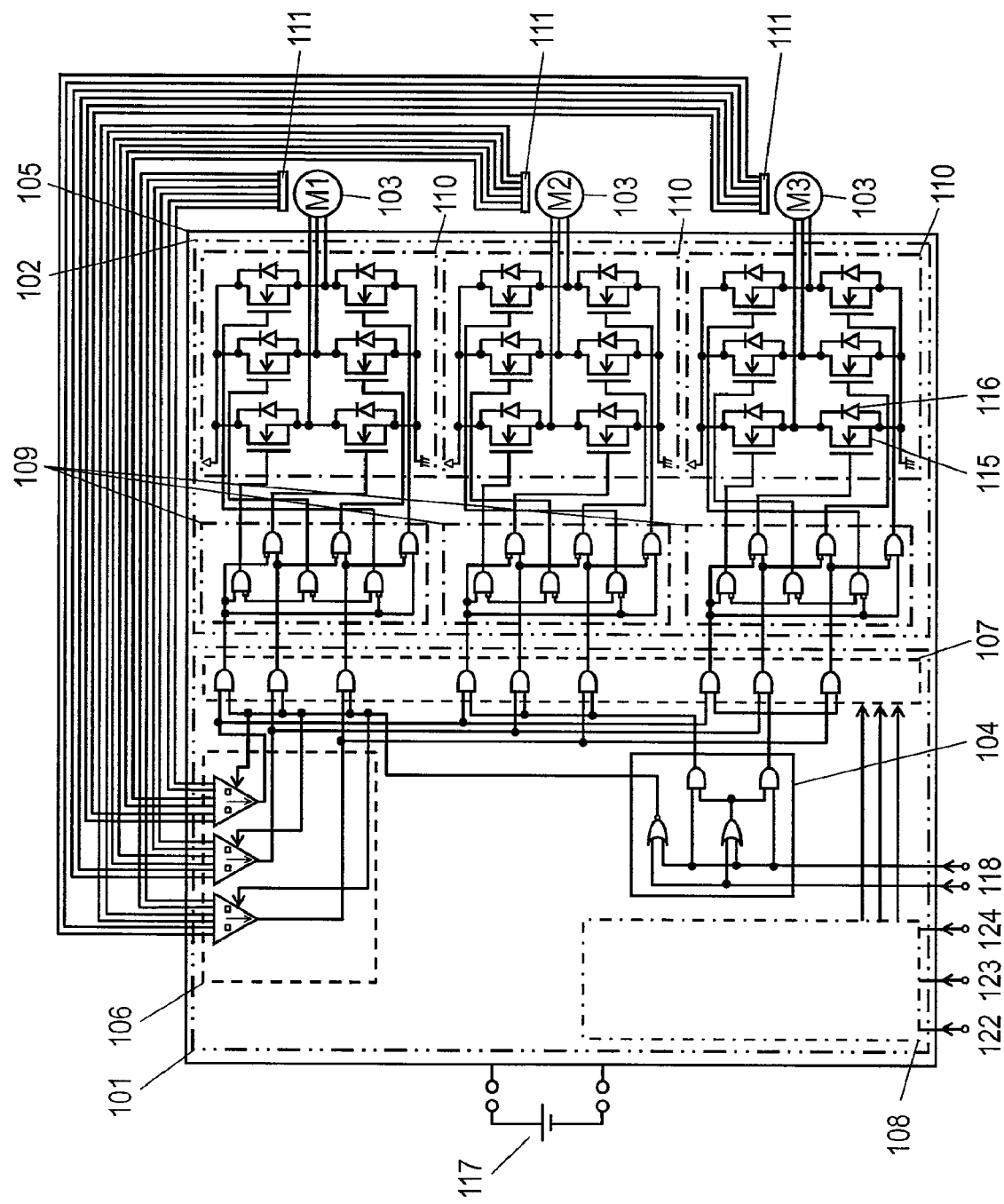
FIG. 2 shows a circuit structure more specifically drawn of the motor drive device in accordance with the first embodiment of the present invention.

FIG. 1 shows a circuit structure of a motor drive device in accordance with a first embodiment of the present invention. FIG. 2 shows a circuit structure more specifically drawn of the motor drive device in accordance with the first embodiment of the present invention.

In FIGS. 1 and 2, the motor drive device comprises the following elements:
drive control circuit 101 for controlling the operation of three motors (M1, M2, and M3) and processing respective position detection signals 120;
power output circuit 102 including:
pre-drive circuits 109 coupled to drive control circuit 101 for generating excitation switching signals 119 of motor 103 to be driven (one of motors M1-M3); and
power switching circuits 110 for supplying an electric current to motor 103 to be driven (one of motors M1-M3) in response to an output from pre-drive circuits 109;
three motors 103 (M1-M3) to be driven by power output circuit 102; and
dc power supply 117.

Three power switching circuits 110 are prepared independently for respective motors 103 (M1, M2, and M3), and three pre-drive circuits 109 are prepared independently for each one of power switching circuits 110.

A motor switching section (described later) selects one motor to be driven out of three motors 103 (M1-M3) in response to an instruction supplied from the outside of the motor drive device to drive control circuit 101, then the selected motor is driven.

The motor switching section discussed above has the following structure and works as described below:
The instruction came from outside the motor drive device is supplied to motor switching circuit 104 of drive control circuit 101, which includes the following elements:
position detection signal processing circuit 106 for selecting, in response to an output of motor switching circuit 104, and amplifying position detection signal 120 of motor 103 (one of motors M1-M3) to be driven out of position detection signals 120 supplied from respective position detectors 111 of each one of three motors 103 (M1-M3); and
position detection output switching circuit 107 for selecting, in response to the output from motor switching circuit 104, pre-drive circuit 109 coupled to power switching circuit 110 of motor 103 (one of motors M1-M3) to be driven, and then supplying position detection processed signal 121 tapped off from position detection signal processing circuit 106 to the selected pre-drive circuit 109.

The foregoing structure allows defining correspondences between position detection signal 120 of motor 103 (one of motors M1-M3) to be driven and power switching circuit 110 coupled to motor 103 to be driven, and switching of the motor to be driven is done in response to an external instruction.

In this first embodiment, drive control circuit 101 includes operation mode switching circuit 108 having work/stop switching circuit 112, forward/reverse rotation switching circuit 113, and brake mode switching circuit 114. This drive control circuit 101 and power output circuit 102 are integrated into one chip semiconductor element 105.

Next, functions and operation of the foregoing circuits are detailed. Each one of position detectors 111 of respective motors 103 (M1-M3) detects a relative position between a permanent magnet of the rotor and the stator, and outputs position detection signal 120 to position detection signal processing circuit 106, which then selects, in response to an output from motor switching circuit 104, position detection signal 120 of motor 103 (one of motors M1, M2, M3) to be driven out of the three motors 103 (M1-M3). The processed signal, i.e. position detection processed signal 121, is supplied to position detection output switching circuit 107, which also receives the output from motor switching circuit 104, whereby an output signal from position detection output switching circuit 107 is selected and then supplied to power output circuit 102 of motor 103 (one of motors M1-M3) to be driven.

Power output circuit 102 includes the following elements:
pre-drive circuits 109 for generating excitation switching signal 119 of motor 103 (one of motors M1-M3) to be driven using an output from drive control circuit 101; and
power switching circuits 110 for supplying an electric current, in response to the output from pre-drive circuit 109, to motor 103 to be driven.

Pre-drive circuit 109 generates an excitation pattern of power switching circuit 110 using position detection processed signal 121, supplied from position detection output switching circuit 107, of motor 103 to be driven. Power switching circuit 110 is formed of a three-phase full bridge circuit including six power switching elements 115. In the case of using a bi-polar transistor as power switching element 115, anti-parallel diode 116 should be externally connected for passing a return current through supposed to occur in PWM driving. In the case of using MOSFET as power switching element 115, a built-in anti-parallel diode allows passing the return current through.

Operation mode switching circuit 108 comprises the following elements:
work/stop switching circuit 112 for switching the motor from work state to stop state or vice versa;
forward/reverse rotation switching circuit 113 for switching the motor from forward rotation to reverse rotation or vice versa; and
brake mode switching circuit 114 for selecting one of a free-run mode which turns off all the three-phase power switching circuits 110 by using a motor stopping signal or a short brake mode which stops the motor within a short time by applying an electromagnetic brake.

Three motors 103 (M1, M2, and M3) employs three-phase brush-less motors, and position detector 111 employing a Hall element detects a relative position between a permanent magnet of the rotor and the stator. Instead of position detector 111, what is called "a sensor-less system" can be employed for detecting back electromotive force generated on the coil of motors 103, thereby obtaining position detection signal 120 based on the zero-cross point. This method allows further lowering the cost of the entire motor drive device.

Figure 3:
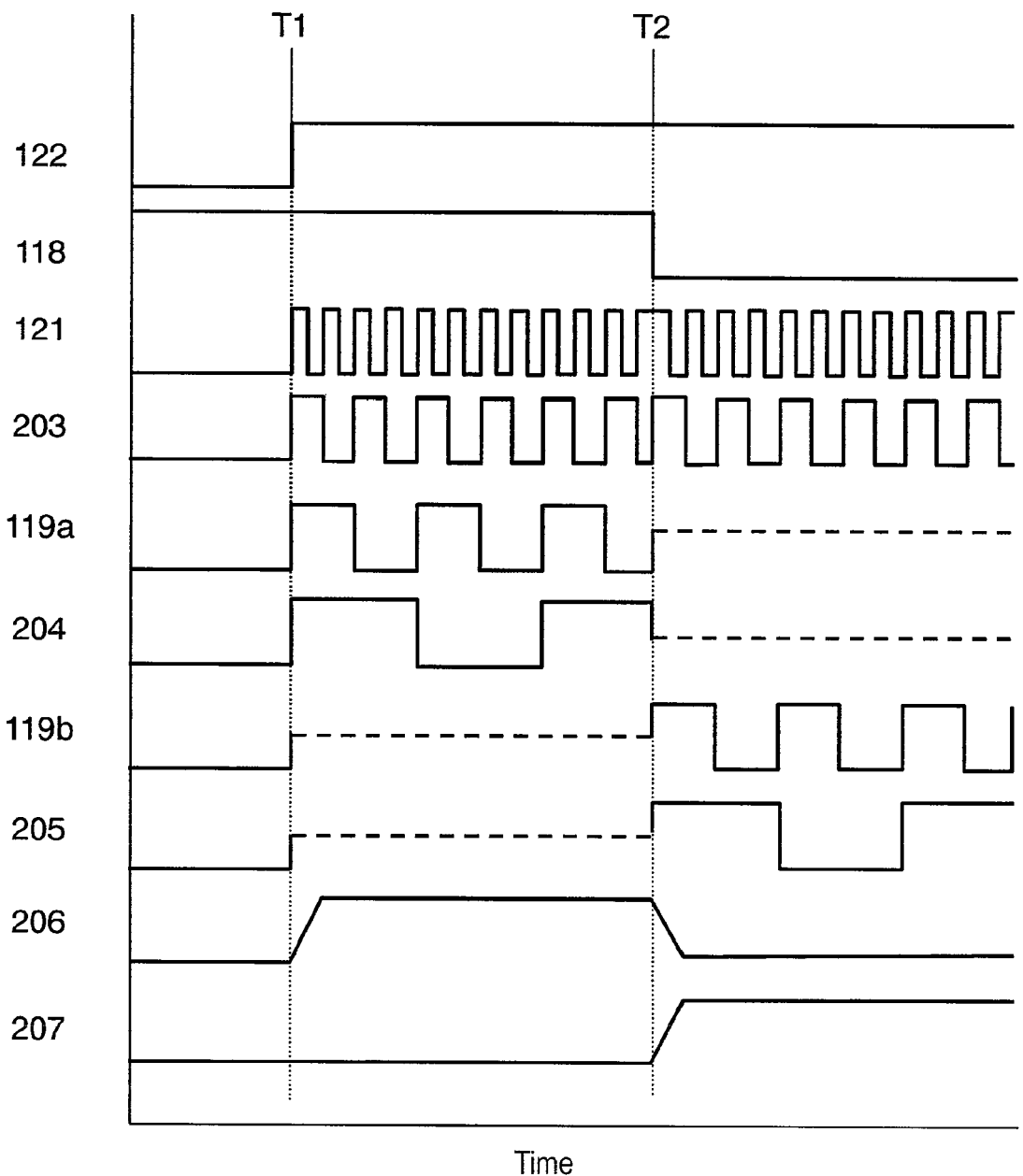
FIG. 3 shows timing charts of signal waveforms of respective sections in switching over the motors in accordance with the first embodiment of the present invention.

In the foregoing structure, switching operation of three motors 103 (M1-M3) is described with reference to FIGS. 1-3. FIG. 3 shows timing charts in switching from the first motor to the second motor in accordance with the first embodiment of the present invention.

In FIG. 3, the vertical axis represents the following items from the top: work/stop switching signal 122, motor switching signal 118, position detection processed signal 121, output signal 203 from position detection output switching circuit, first motor excitation switching signal 119a, output 204 from first motor power switching circuit, second motor excitation switching signal 119b, output 205 from second motor power switching circuit, first motor rpm 206, second motor rpm 207. The horizontal axis represents a time. The low level of work/stop switching signal 122 indicates a stop signal, and the high level indicates a work signal. Motor switching signal 118 shows a first motor selecting signal at its high level, and the second motor selecting signal at its low level.

As an initial state, motor switching signal 118 is supplied in advance on a high level, i.e. the signal selects the first motor, to drive control circuit 101 from the outside, and signal 118 has an instruction showing which motor 103 (one of motors M1-M3) is to be driven. Work/stop switching signal 122 is supplied on a low level externally to circuit 101, i.e. indicating a stop status, and forward/reverse rotation switching signal 123 as well as brake mode switching signal 124 is also supplied in an appropriate status selected respectively.

After the foregoing state is prepared, work/stop switching signal 122 is switched to the high level (work signal) at timing T1 shown in FIG. 3, and when the work signal is supplied to work/stop switching circuit 112, an output from motor switching circuit 104 selects first motor position detection signal 120 as an input to position detection signal processing circuit 106 because motor switching signal 118 is already supplied on a high level to motor switching circuit 104. Then signal 120 is amplified by circuit 106 and supplied as position detection processed signal 121 to position detection output switching circuit 107. Signal 121 then selects, in response to an output from motor switching circuit 104, pre-drive circuit 109 corresponding to the first motor, and the position detection output switching circuit 107 outputs signal 203. Then excitation switching signal 119a, which is an output from pre-drive circuit 109 corresponding to the first motor, is supplied to power switching circuit 110 of the first motor, and this power switching circuit 110 supplies an electric current (output 204 from first motor power switching circuit) to the first motor, which thus starts rotating at the timing T1.

After the first motor reaches a target rpm, motor switching signal 118 is switched to the low level (the second motor is selected) and this low level signal is supplied to motor switching circuit 104, then position detection signal 120 of the second motor is selected as an input to position detection signal processing circuit 106, where signal 120 undergoes amplification, and is output as position detection processed signal 121. At the timing T2 onward, position detection processed signal 121 thus corresponds to position detection signal 120 of the second motor.

Position detection processed signal 121 is supplied to position detection output switching circuit 107, and selects pre-drive circuit 109, in response to an output from motor switching circuit 104, corresponding to the second motor, so that position detection output switching circuit 107 outputs signal 203. In other words, at timing T2 onward, output signal 203 from position detection output switching circuit 107 corresponds to position detection signal 120 of the second motor. Excitation switching signal 119b supplied from pre-drive circuit 109 corresponding to the second motor is input to power switching circuit 110 of the second motor. Circuit 110 supplies an electric current (output 205 from the power switching circuit of the second motor) to the second motor, which starts rotating at the timing T2.

Simultaneously with this timing T2, the output from position detection output switching circuit 107 is separated from pre-drive circuit 109 corresponding to the first motor. Excitation switching signal 119a, i.e. an output from this pre-drive circuit 109 becomes in a high-impedance status, so that output 204 from power switching circuit 110 of the first motor becomes also in a high-impedance status (both of the upper and lower switching elements are turned off, so that an output impedance becomes extremely high). The first motor thus stops rotating.

As discussed above, in the motor drive device which alternately drives a plurality of motors, a motor switching circuit that switches from a motor to another motor supposed to be driven employs no mechanical relay, so that contact-less switching is achievable. At the moment when the motor to be driven is switched to another one, all the three-phase power switching elements of the motor hitherto driven are turned off.

During the operation of the motor, if forward/reverse rotation switching signal 123 is input to drive control circuit 101, or if motor switching signal 118 for switching from the motor approaching a target rpm to another motor supposed to be driven is input to circuit 101, power switching circuit 110 in driving is isolated from position detection output switching circuit 107 as discussed above, so that the electric current cannot be supplied to the motor. Although conventional related art detects a motor stop signal, and then it should wait until a given delay time runs past before motor switching circuit 104 starts working. According to the present invention, however, power switching circuit 110 is thus kept connecting to the motor coil, which can absorb stored energy in the motor coil, so that no surge voltage or no arc discharge can be generated in power switching circuit 110.

Switchover of driving the motor regardless of the switch timing is thus achievable, so that a switching time can be greatly shortened, which allows obtaining a highly reliable motor drive device having a longer service life. Since the three motors 103 (M1-M3) alternately rotate, power output circuit 102 is switched to another one coupled to the motor selected, so that only one of three power switching circuits 110 can be operated, and thus no increase is expected in heat generation due to consumption of electric power energy. The integration into one chip can be thus achieved with more ease.

On top of that, drive control circuit 101 can be shared with the three motors 103, so that the circuit size is greatly downsized comparing with a case where two circuits are packed into one package. The circuit can be thus simplified and the package can be downsized, so that a more inexpensive motor drive device is obtainable.

Embodiment 2

Figure 4:
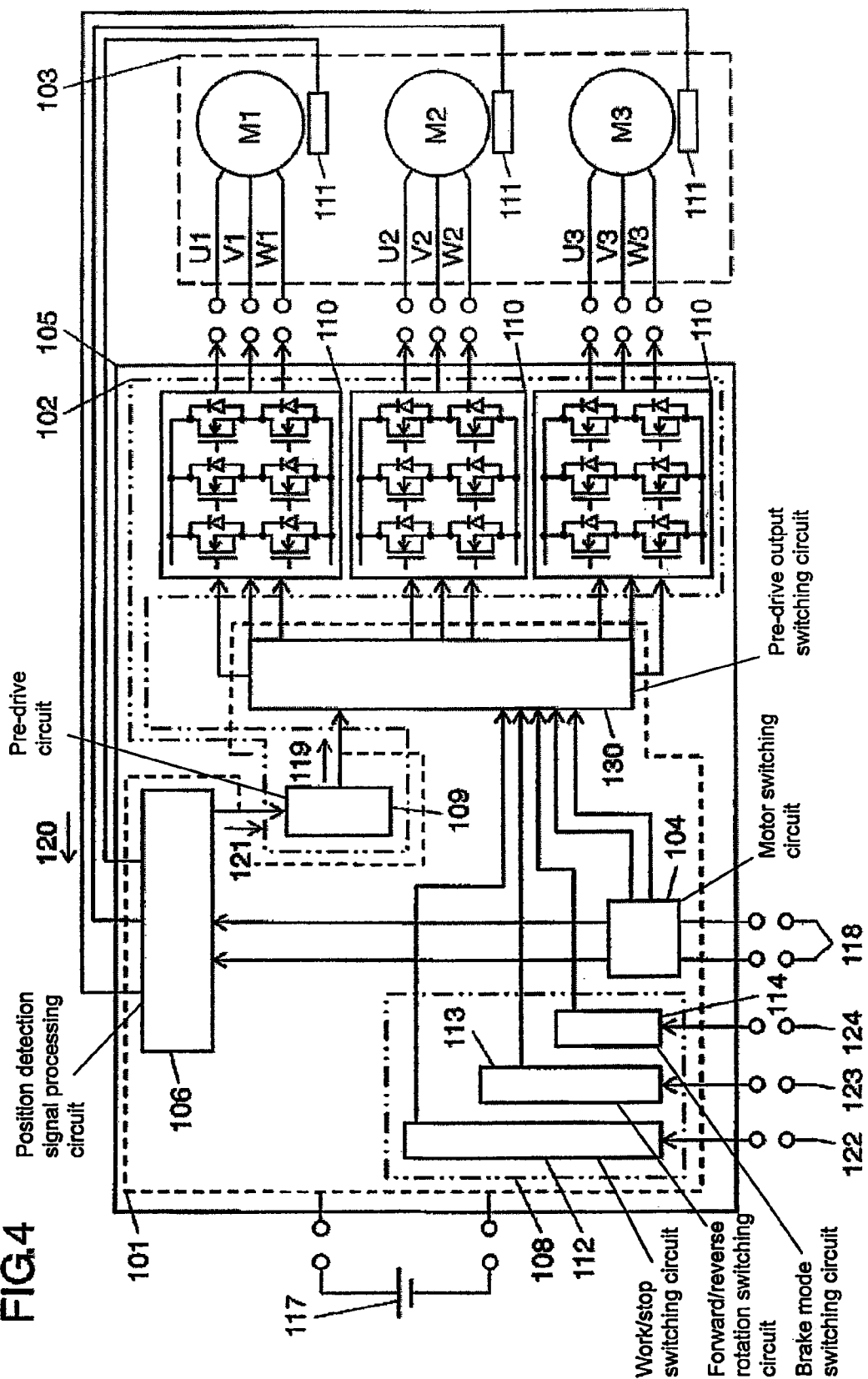
FIG. 4 shows a circuit structure of a motor drive device in accordance with a second embodiment of the present invention.
Figure 5:
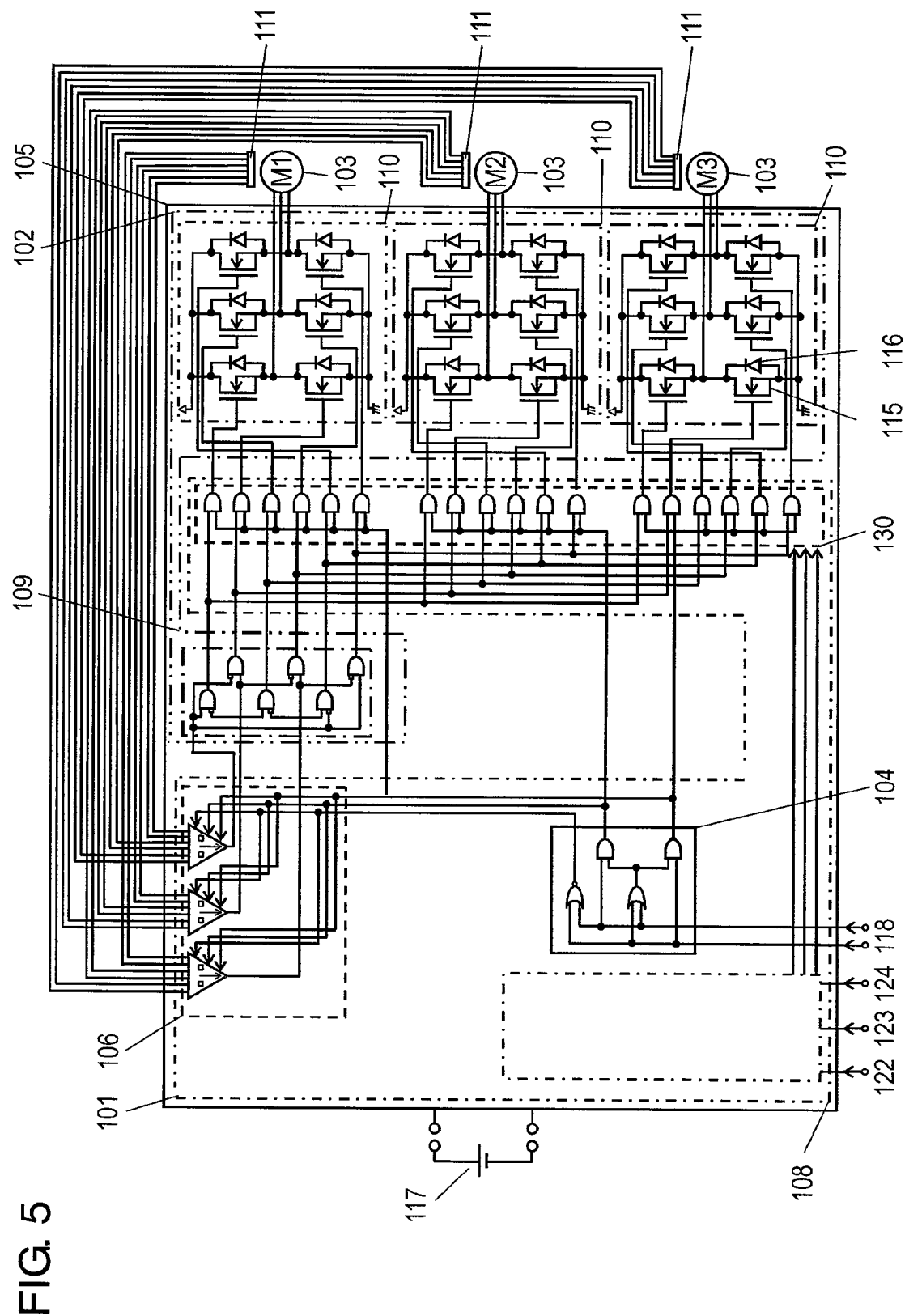
FIG. 5 shows a circuit structure more specifically drawn of the motor drive device in accordance with the second embodiment of the present invention.

FIG. 4 shows a circuit structure of a motor drive device in accordance with the second embodiment of the present invention. FIG. 5 shows the circuit structure more specifically drawn of the motor drive device in accordance with the second embodiment of the present invention. Similar elements to those in the first embodiment have the same reference marks, and the descriptions thereof are omitted here.

The second embodiment differs from the first one in an integration of pre-drive circuits 109 into one circuit to be shared with three motors, namely, position detection processed signal 121 supplied from position detection signal processing circuit 106 is directly input to pre-drive circuit 109, of which output is supplied to pre-drive output switching circuit 130, which selects, in response to an output from motor switching circuit 104, power switching circuit 110 of motor 103 (one of motors M1-M3) to be driven, so that a switchover of the motor can be done. Position detection signal processing circuit 106 selects, in response to outputs from motor switching circuit 104, position detection signal 120 of motor 103 (one of motor M1-M3) to be driven out of respective position detection signals 120 supplied from each one of motor 103, and amplifies the selected signal 120. This process of circuit 106 is the same as that described in the first embodiment.

The foregoing structure allows defining correspondences between position detection signal 120 of motor 103 (one of motors M1-M3) to be driven and power switching circuit 110 coupled to motor 103 to be driven, and switching of the motor to be driven is done in response to an external instruction.

Figure 6:
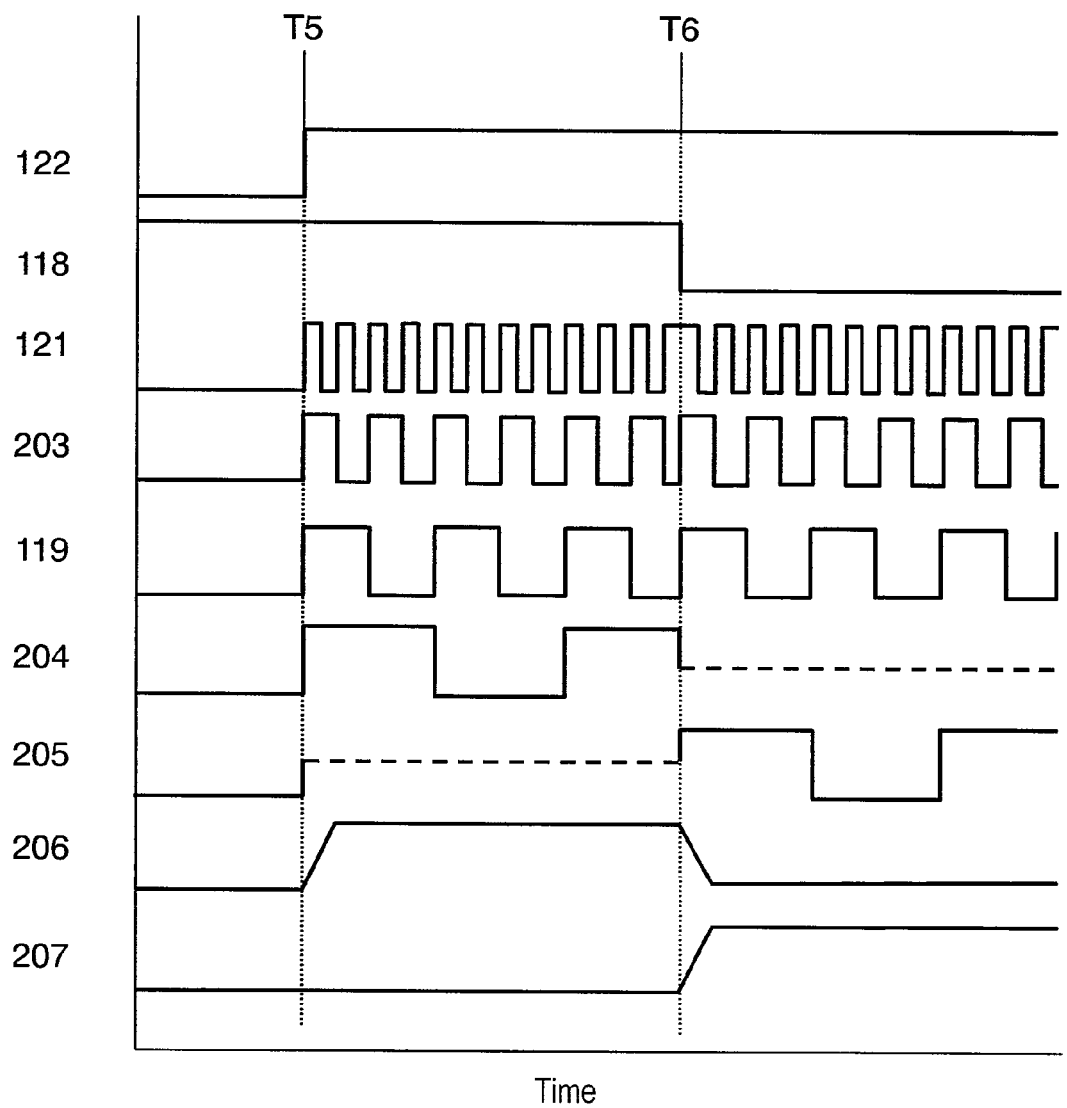
FIG. 6 shows timing charts of signal waveforms of respective sections in switching over the motors in accordance with the second embodiment of the present invention.
Figure 7:
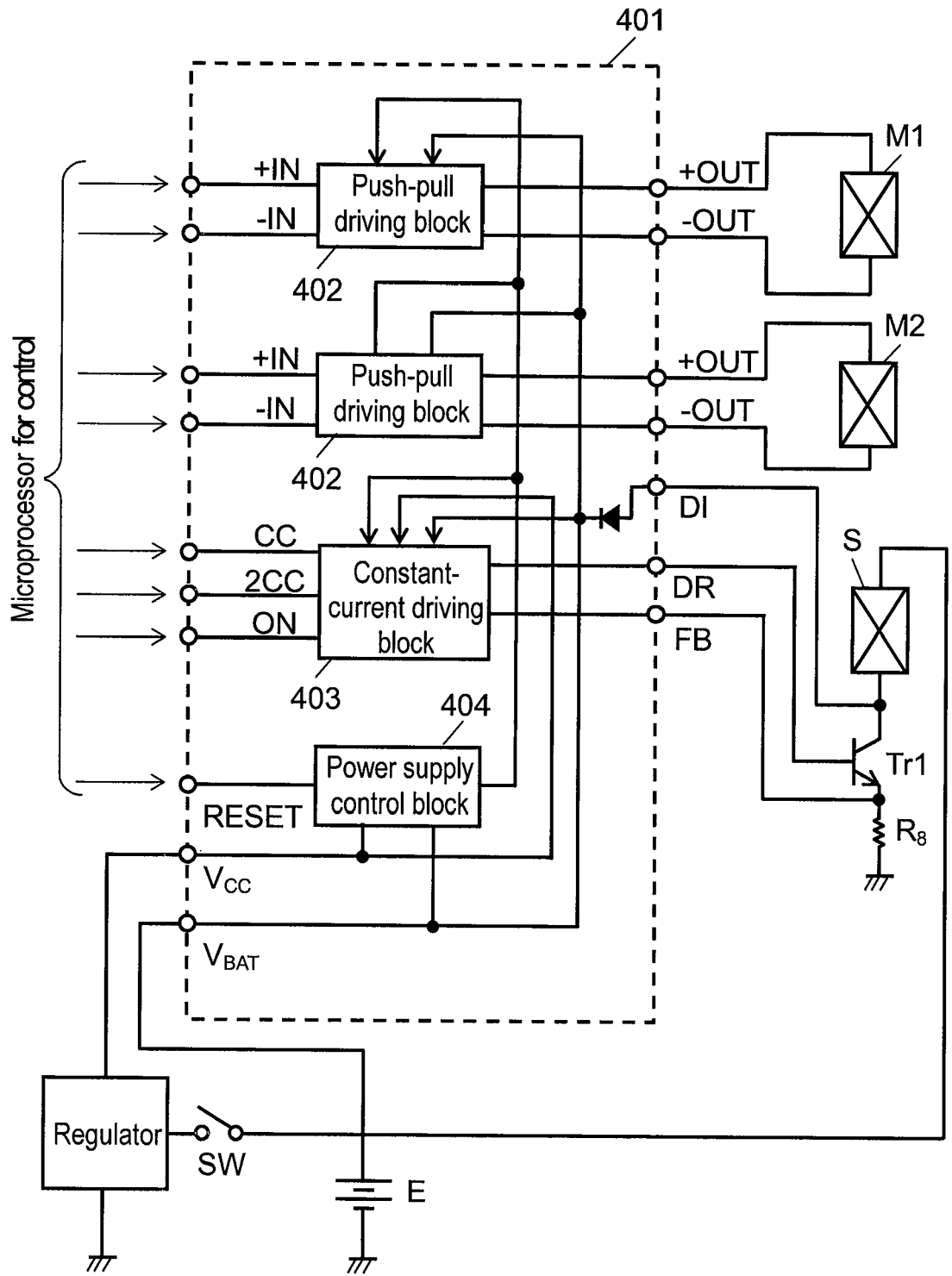
FIG. 7 shows a circuit structure of a conventional motor drive device.
Figure 8:
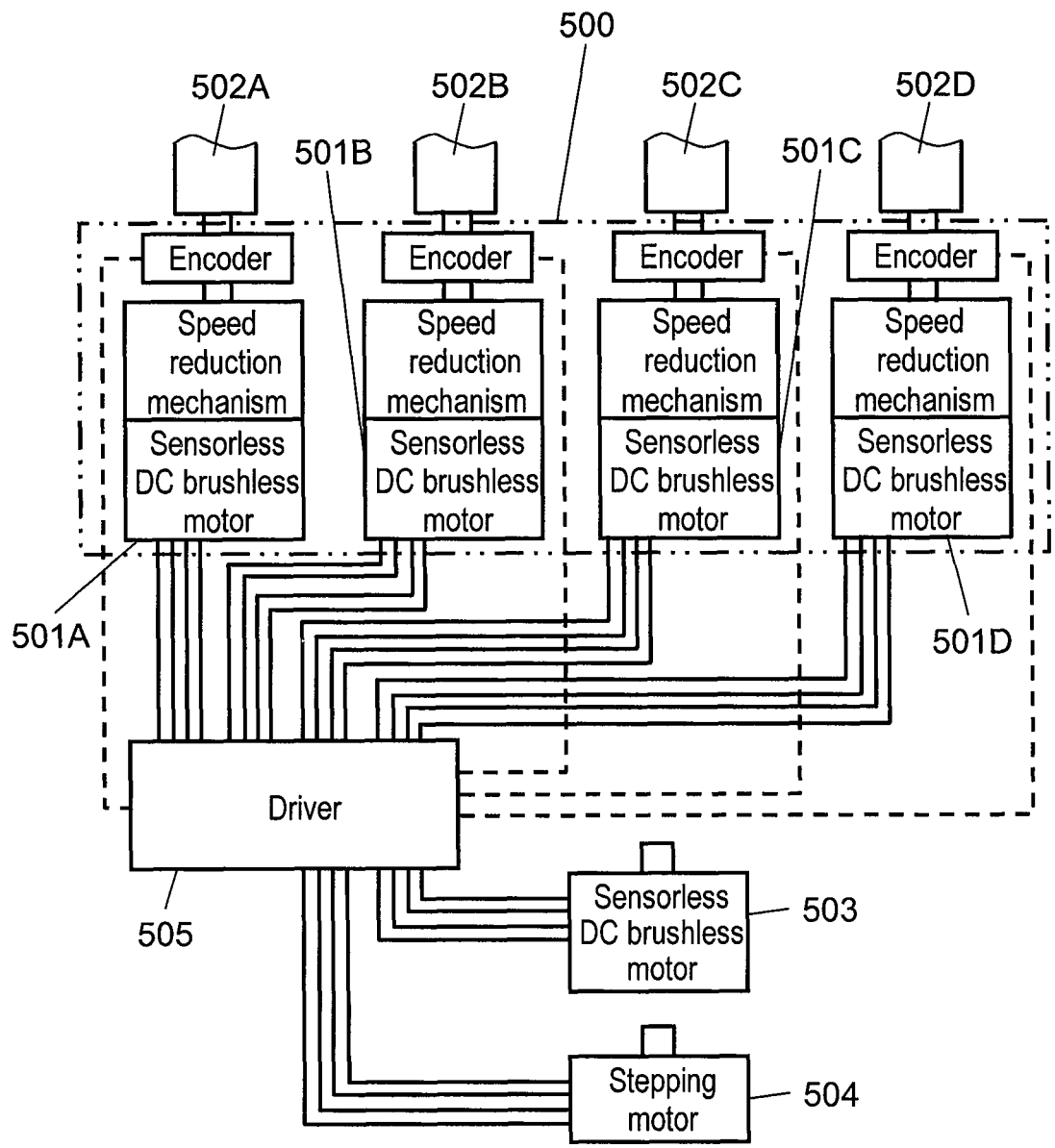
FIG. 8 shows a circuit structure of another conventional motor drive device.
Figure 9:
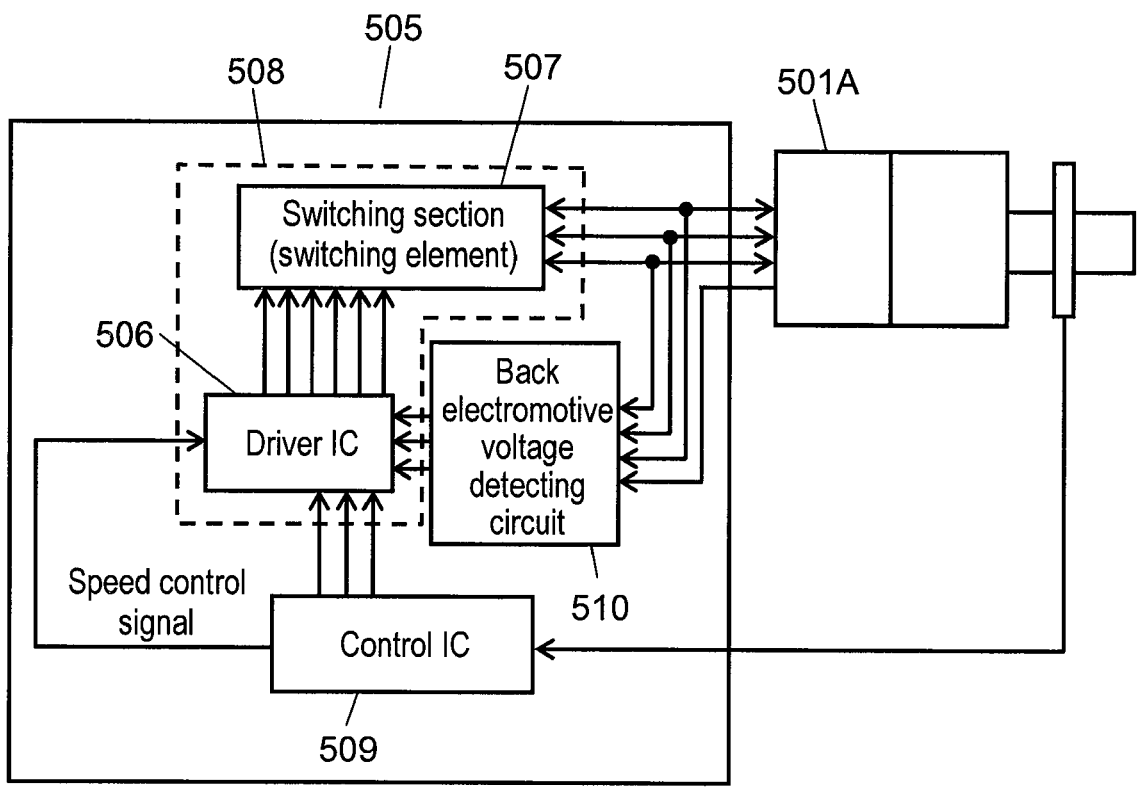
FIG. 9 shows a circuit structure of a driving section of the conventional motor drive device shown in FIG. 8.
Figure 10:
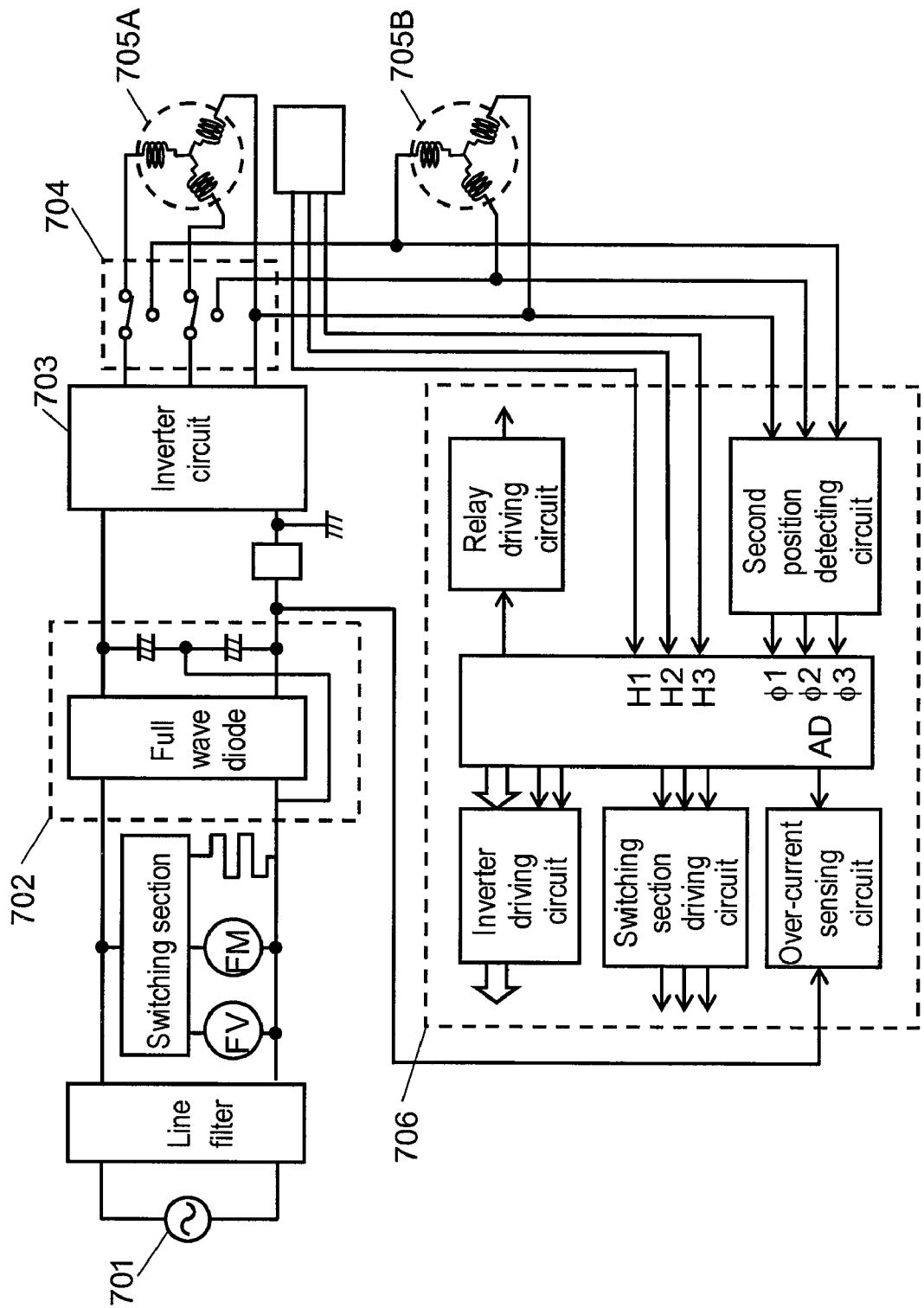
FIG. 10 shows a circuit structure of a driving section of another conventional motor drive device.
Figure 11:
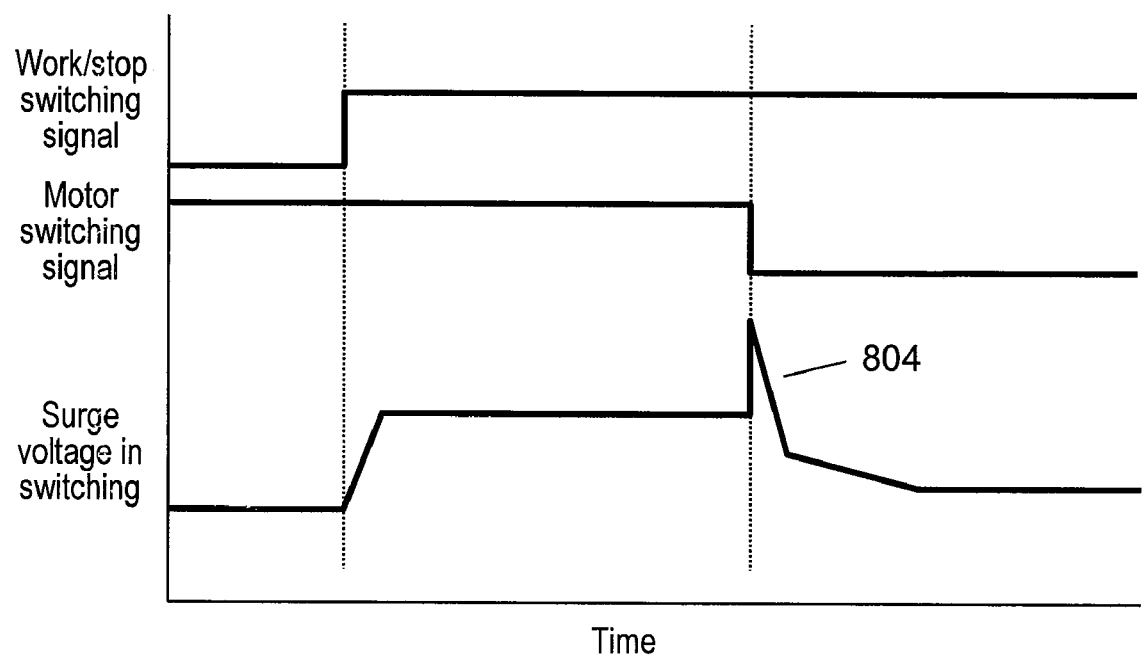
FIG. 11 shows a timing chart of signal waveforms of respective sections in switching over the motors with the conventional motor drive device shown in FIG. 10.
Figure 12:
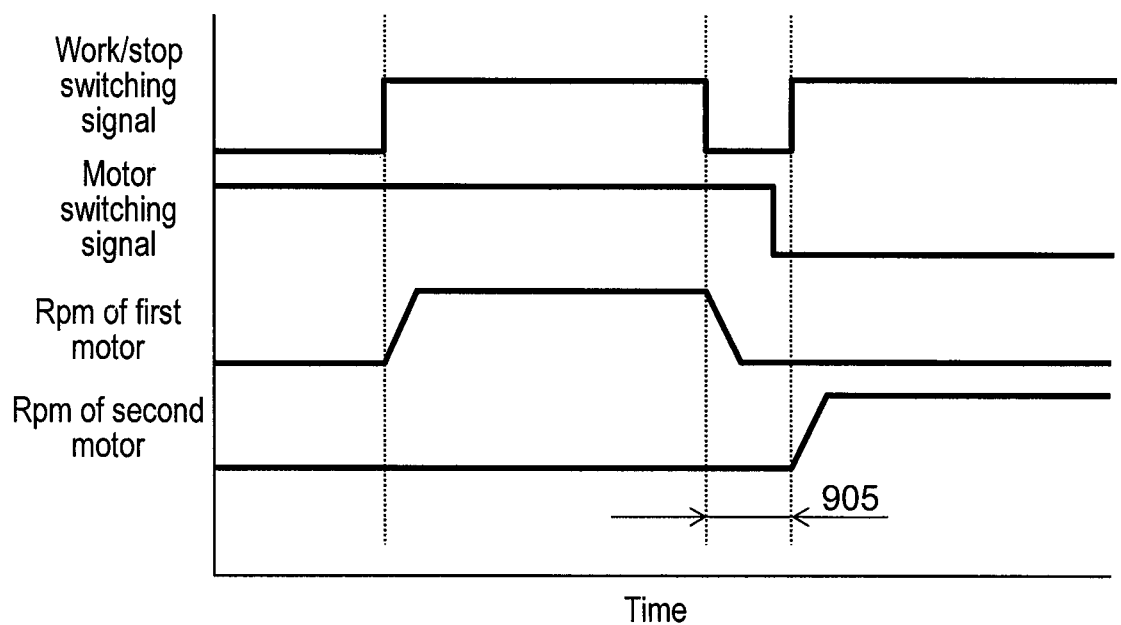
FIG. 12 shows a timing chart of signal waveforms of respective sections in switching over the motors with the conventional motor drive device shown in FIG. 10.

In the structure discussed above, a switchover operation among three motors 103 (M1-M3) is demonstrated with reference to FIG. 4-FIG. 6. FIG. 6 shows a timing chart of switching from the first motor to the second motor out of three motors 103 (M1-M3) in accordance with this second embodiment.

FIG. 6 differs from FIG. 3 used for the first embodiment in the following point: Excitation switching signal 119 supplied from pre-drive circuit 109 is output as the excitation switching signal of the first motor during the period from timing T5 to timing T6, and excitation switching signal 119 is output as the excitation switching signal of the second motor after timing T6; at timing T5, switching signal 118 is supplied to motor switching circuit 104 on a high level (in a status of the first motor selecting signal), and at timing T6, motor switching signal 118 is supplied to circuit 104 on a low level (in a status of the second motor selecting signal).

The following preparations are done for the initial status: motor switching signal 118 having an instruction that which motor 103 (one of motors M1-M3) should be driven is supplied in advance on the high level (in the status of the first motor selecting signal) from the outside to drive control circuit 101, and work/stop switching signal 122 is supplied on the low level (in halting status) to drive control circuit 101, and forward/reverse switching signal 123 as well as brake mode switching signal 124 is appropriately selected its status before signal 123 and signal 124 are input to control circuit 101.

After the foregoing initial status is prepared, a work signal of work/stop switching signal 122 is supplied to work/stop switching circuit 112 at timing T5 shown in FIG. 6, then since motor switching signal 118 is already supplied to motor switching circuit 104 on the high level (in a status of the first motor selecting signal), position detection signal 120 of the first motor is selected, in response to an output from motor switching circuit 104, as an input to position detection signal processing circuit 106, and amplified by position detection signal processing circuit 106, and then supplied as position detection processed signal 121 to pre-drive circuit 109, which outputs excitation switching signal 119 to pre-drive output switching circuit 130 for selecting, in response to an output from motor switching circuit 104, power switching circuit 110 corresponding to the first motor, and then signal 119 is output from pre-drive output switching circuit 130. Other power switching circuits 110 corresponding to other motors than the selected first motor have the outputs from pre-drive switching circuit 130 in high impedance state. Power switching circuit 110 supplies an electric current (output 204 from the power switching circuit of the first motor) to the first motor, and the first motor starts rotating at the foregoing timing T5.

Next, after the motor reaches the target rpm, motor switching signal 118 is switched to the low level (in the status of selecting the second motor) and supplied to motor switching circuit 104, then position detection signal 120 of the second motor is selected as an input to position detection signal processing circuit 106, and amplified by position detection signal processing circuit 106 before signal 120 is supplied to pre-drive circuit 109 as position detection processed signal 121. Pre-drive circuit 109 outputs excitation switching signal 119 to pre-drive output switching circuit 130 for selecting, in response to an output from motor switching circuit 104, power switching circuit 110 corresponding to the second motor, and then signal 119 is supplied from pre-drive output switching circuit 130. In other words, excitation switching signal 119 is generated from position detection signal 120 of the second motor by pre-drive circuit 109, and then supplied from pre-drive output switching circuit 130 to power switching circuit 110 corresponding to the second motor. Power switching circuit 110 supplies an electric current (output 205 from the power switching circuit of the second motor) to the second motor, and the second motor starts rotating at the foregoing timing T6.

At the foregoing timing T6, pre-drive output switching circuit 130 supplies an output in the high impedance state to power switching circuit 110 corresponding to the first motor, and output 204 from power switching circuit 110 becomes also in the high impedance state, so that the first motor stops rotating.

The second embodiment thus produces a similar advantage to that of the first embodiment.

INDUSTRIAL APPLICABILITY

A motor drive device of the present invention is useful for a variety of audio & video apparatuses, office automation apparatuses, and home appliances, each of which apparatuses employs a plurality of motors working alternately.

The invention claimed is:

1. A motor drive device for alternately driving a plurality of motors, which motor drive device comprising:
   a motor switching circuit for generating a signal instructing a switchover of driving the plurality of motors;
   a position detection signal processing circuit configured to (i) receive position detection signals from the plurality of motors and the signal from the motor switching circuit and (ii) generate a position detection processed signal based on the position detection signals and the signal from the motor switching circuit;
   a pre-drive circuit configured to receive the position detection processed signal and generate an excitation switching signal for the plurality of motors;
   a plurality of power switching circuits configured to (i) receive the excitation switching signal from the pre-drive circuit and (ii) supply an electric current based on the excitation switching signal from the pre-drive circuit to at least one of the plurality of motors,
   wherein the position detection signal processing circuit selects, in response to an input to the motor switching circuit, a position detection signal of one of the motors to be driven out of the position detection signals of the plurality of motors, and inputs a position detection processed signal to the pre-drive circuit, and then one of the plurality of power switching circuits is selected for driving the motor to be driven.

2. The motor drive device of claim 1, wherein the position detection signal processing circuit, the pre-drive circuit, the power switching circuit, and the motor switching circuit are integrated into one chip semiconductor element.

3. The motor drive device of claim 2, wherein the one chip semiconductor element further includes an operation mode switching circuit which has a work/stop switching circuit of the motors, a forward/reverse rotation switching circuit, and a brake mode switching circuit.

4. The motor drive device of claim 1, wherein a plurality of the pre-drive circuits are prepared for corresponding to each one of the plurality of power switching circuits, and the position detection processed signal selects and is supplied to one of the pre-drive circuits corresponding to the motor to be driven.

5. The motor drive device of claim 1, wherein the plurality of power switching circuits share a single unit of the pre-drive circuit, and an output from the pre-drive circuit selects and is supplied to a power switching circuit corresponding to the motor to be driven.

6. The motor drive device of claim 1, wherein the plurality of power switching circuits except one circuit selected for the motor to be driven become in high impedance state.

7. The motor drive device of claim 1, wherein the plurality of motors are three-phase DC brushless motors including a position detector for outputting the position detection signal.

8. The motor drive device of claim 1, wherein the plurality of motors are three-phase DC brushless motors, and each one of which motors detects a relative position between a rotor and a stator by using back-electromotive force of each one of the motors and the motor outputs the position detection signal.

* * * * *